United States Patent
Liu et al.

(10) Patent No.: US 8,050,987 B2
(45) Date of Patent: Nov. 1, 2011

(54) METHOD AND APPARATUS FOR PROCESSING ON-LINE DONATIONS ASSOCIATED WITH MEDIA CONTENT

(75) Inventors: Deborah Yee-Ky Liu, Santa Clara, CA (US); Su-I Lu, Mountain View, CA (US)

(73) Assignee: eBay Inc., San Jose, CA (US)

( * ) Notice: Subject to any disclaimer, the term of this patent is extended or adjusted under 35 U.S.C. 154(b) by 228 days.

(21) Appl. No.: 12/169,829

(22) Filed: Jul. 9, 2008

(65) Prior Publication Data
US 2010/0010921 A1    Jan. 14, 2010

(51) Int. Cl.
*G07B 17/00* (2006.01)
(52) U.S. Cl. ............... 705/30; 705/14; 705/26; 705/35; 705/39; 705/40
(58) Field of Classification Search .............. 705/14, 705/26, 30, 35, 39–40
See application file for complete search history.

(56) References Cited

U.S. PATENT DOCUMENTS

| | | | |
|---|---|---|---|
| 5,909,794 A | 6/1999 | Molbak et al. | |
| 2003/0225689 A1* | 12/2003 | MacFarlane et al. | 705/39 |
| 2005/0165641 A1* | 7/2005 | Chu et al. | 705/14 |
| 2008/0109306 A1* | 5/2008 | Maigret et al. | 705/14 |
| 2009/0281905 A1* | 11/2009 | Walton | 705/26 |

* cited by examiner

*Primary Examiner* — Vanel Frenel
(74) *Attorney, Agent, or Firm* — Schwegman, Lundberg & Woessner, P.A.

(57) ABSTRACT

A computer-implemented method and apparatus for processing on-line donations associated with media content is disclosed. An example embodiment includes elements to integrate a payment button with an associated item of media content on a web page; link the payment button with an account on a payment site; receive a donation from a donor via the payment button; and credit the donation to the account linked to the payment button.

20 Claims, 6 Drawing Sheets

METHOD AND APPARATUS FOR PROCESSING ON-LINE DONATIONS ASSOCIATED WITH MEDIA CONTENT

BACKGROUND

1. Technical Field

This application relates to a method and system to process data. Particularly, this application relates to the processing of on-line donations associated with media content.

2. Related Art

Streaming media, such as videos, audio content, and other forms of content, documents, or software (media content) have long been available on-line via download to networked users. Typically, the consumers of this content either received the content for free or the consumers were prompted to pay (and sometimes register with) a provider of the content prior to the downloading and viewing/use of the content. This conventional streaming content download payment model was flawed, because consumers had to pay for an item of content before knowing whether the content was worth the payment price. Providers were unwilling to make the content available prior to payment, because consumers might be inclined to view/use the content and then refuse payment after viewing/using the content. Some providers make available free trailers, previews, or limited use versions of some content. But these limited use versions do not always provide an accurate assessment of the value of the complete content item. As such, a significant portion of the available networked content is not viewed or used by potential consumers; because content providers are unwilling to do so without assurance of payment.

U.S. Pat. No. 5,909,794 describes a donation transaction apparatus and method for facilitating donations to charitable organizations. The apparatus is configured to receive coins or, in some embodiments, cash or funds transfer authorization or credit charges, and preferably dispenses a donation receipt to the user which the user may use to prepare or document income tax returns. Preferably, the user is able to select among a plurality of charitable organizations to receive the donation.

Thus, a computer-implemented method and apparatus for processing on-line donations associated with media content is needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that the various embodiments may be practiced without these specific details.

According to various example embodiments described herein, there is described a computer-implemented method and apparatus for processing on-line donations associated with media content. In an example embodiment, donation, payment, or giving functionality associated with media content can be implemented on a publication system (e.g., a media content source or facilitator, content provider site, on-line goods or services provider, a blog system, a community forum system, a bulletin board system, a forms system, a network-based social network system, such as MYSPACE.COM, or a network-based marketplace, such as EBAY.COM or any other system via which a user may publish media content or information on a network (e.g., the Internet), with the support of a payments or financial system (e.g., a networked banking system or payment system, e.g. PAYPAL.COM).

Various embodiments relate to integrating payment functionality with media content rendering or downloading functionality to prompt a consumer or viewer (donor) for donations or payment related to media content provided via a network. Particular embodiments do not require payment from the consumer/viewer prior to making the media content available to the consumer/viewer. Various embodiments relate to allowing a user to set up functionality to solicit and obtain donations or payment associated with media content integrated with a payment system backend (e.g. PayPal) in support of a payment (e.g. 'donate') button provided on the publisher or host site or with other functionality for effecting the downloading, viewing, or consumption of the associated media content. In an example embodiment, the payment functionality is activated through a 'donate' button linked with a user's payment system account (e.g. PayPal) and a media content provider's receivables account (e.g. PayPal). Examples of such a 'donate' button in particular embodiments are shown in FIGS. 4 and 5.

Figure 4:
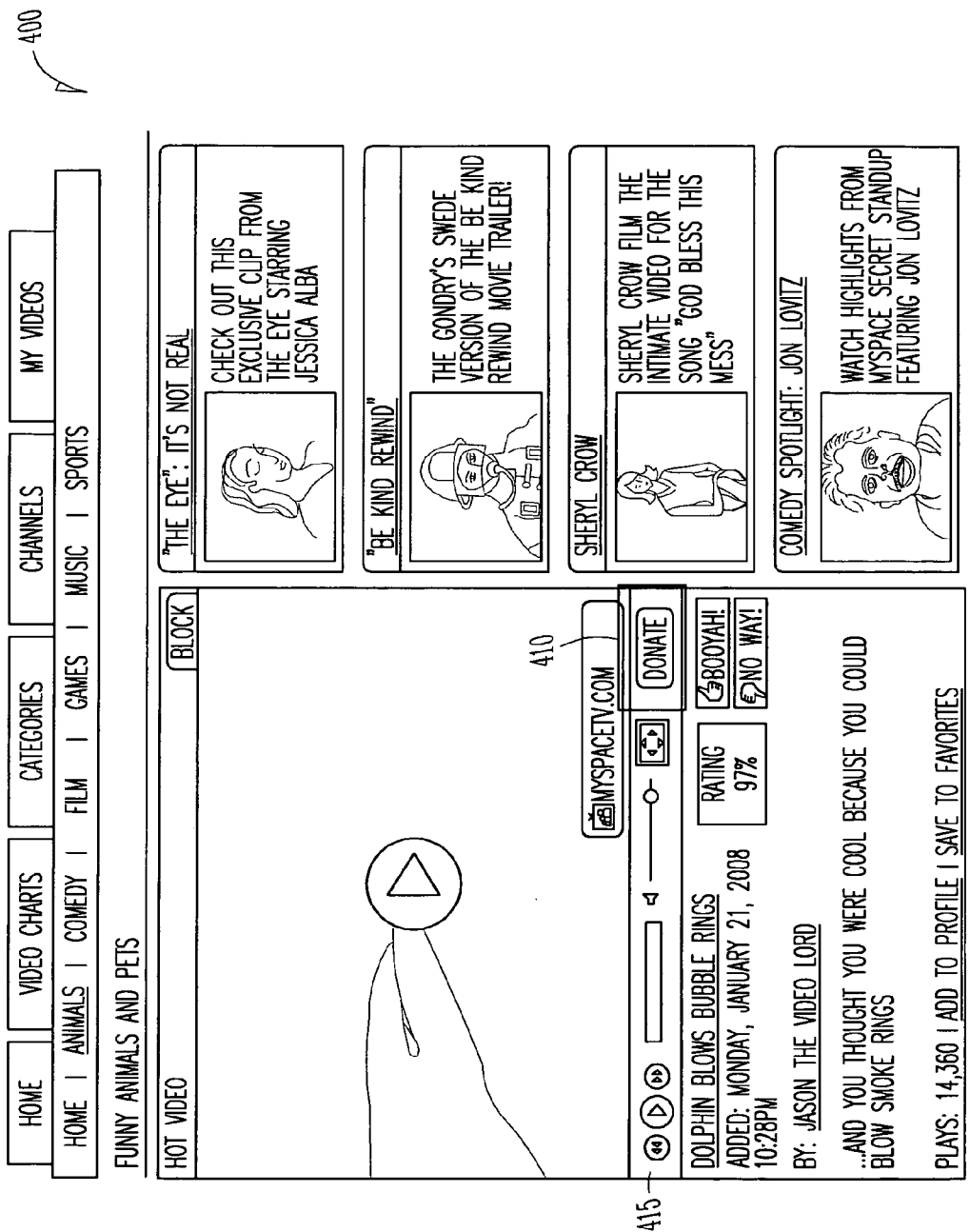
FIGS. 4-5 illustrate an example embodiment of a user interface for integrating a payment (e.g. 'donate') button with media content.

FIG. 4 illustrates a publisher site page 400 that includes a 'donate' button 410 with which a user can be prompted for donations related to media content provided via a network. Page 400 also includes various conventional options embodied as a 'player' 415 for activating functionality for viewing media content (e.g. a streamed video), including a 'play' button, volume, and the like. Such conventional player 415 options, available in well-known technologies, enable a consumer/viewer to download, view, use, or otherwise consume an item of media content. As an additional option in a particular embodiment, the 'donate' button 410 can be added to or integrated with a set of buttons provided by the player 415 as shown in FIG. 4. The 'donate' button 410 enables the consumer/viewer to donate value (e.g. money, credit, points, and the like) associated with the media being served by the player 415. In a particular embodiment, the player 415 is not prevented from serving the selected media, even if the consumer/viewer chooses to not use the 'donate' button 410 to provide value associated with the media content. However, at any time before, during, or after viewing the associated media content, the consumer/viewer can choose to use the 'donate' button 410 to provide value associated with the media content. In another particular embodiment, the player 415 is enabled to play only a trailer, a preview, or a timed portion of the selected media content prior to a consumer/viewer using the 'donate' button 410 to provide value associated with the media content. In this embodiment, the player 415 is not enabled to play the entire selected media content if the consumer/user does not use the 'donate' button 410 to provide some value associated with the media content. In yet another particular embodiment, the player 415 is enabled to play only a low quality, degraded, or shortened version of the selected media content prior to a consumer/viewer using the 'donate' button 410 to provide value associated with the media content. In this embodiment, the player 415 is not enabled to play the high quality, non-degraded, or full length version of the selected media content if the consumer/user does not use the 'donate' button 410 to provide some value associated with the media content. The consumer/viewer can activate 'donate' button 410 by clicking on the button 410 using a conventional pointing device or mouse. Upon activation of the 'donate' button 410, a series of operations, described in more detail below, enable the consumer/viewer to provide value associated with the media content.

Figure 5:
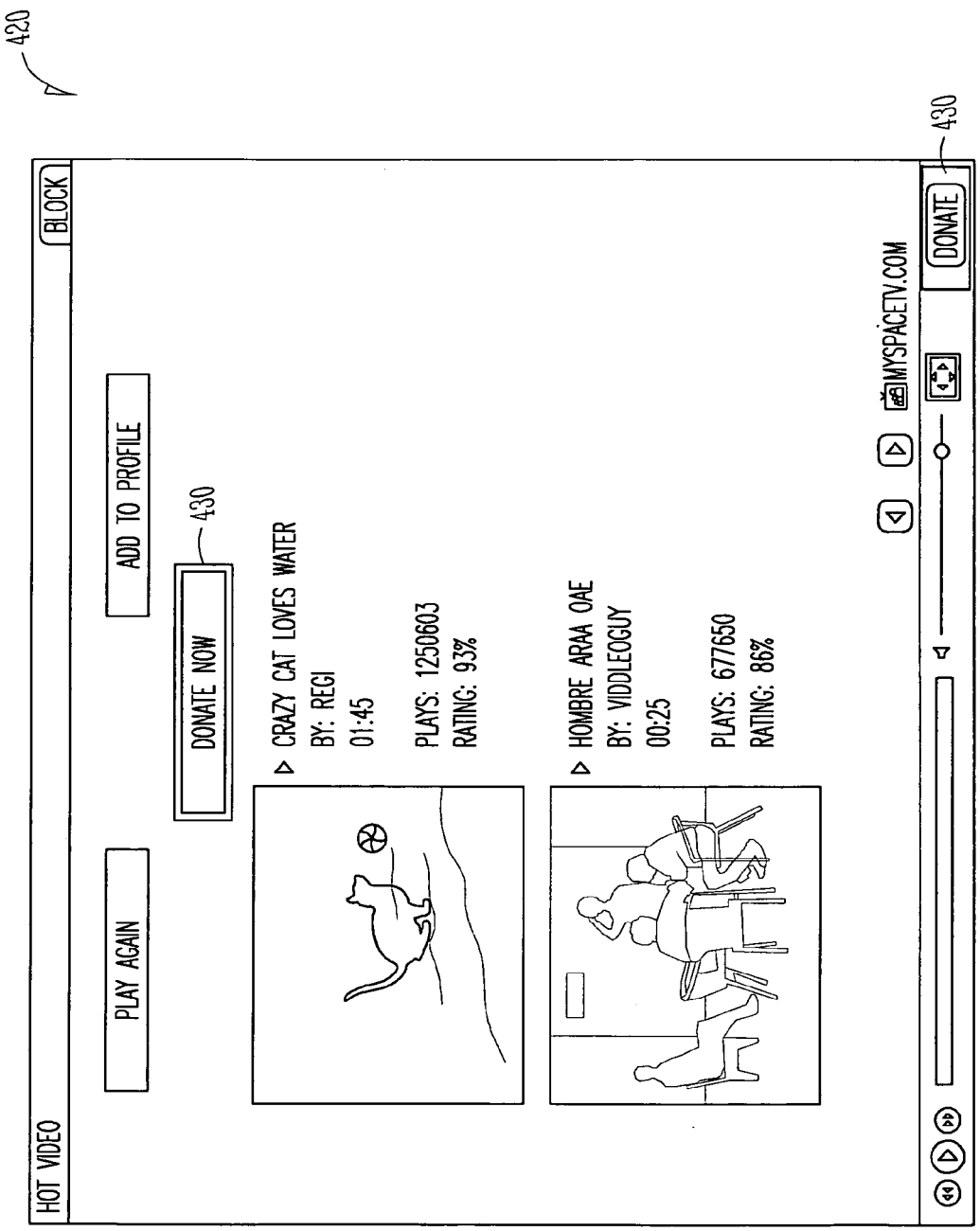

Referring to FIG. 5, another example player 420 is shown with example 'donate' buttons 430 displayed on or in association with player 420 functionality. As described earlier, player 420 is one well-known mechanism for making media content available to a consumer/viewer. In the example shown in FIG. 5, 'donate' buttons 430 can be integrated or associated with player 420 to prompt the consumer/user to provide value associated with the media content viewed or consumed using player 420. The consumer/viewer can activate 'donate' buttons 430 by clicking on one of the buttons 430 using a conventional pointing device or mouse. Upon activation of one of the 'donate' buttons 430, a series of operations, described in more detail below, enable the consumer/viewer to provide value associated with the media content.

In an initial series of operations, a media content provider can set up a receivables account using a conventional on-line account provider (e.g. PayPal). The receivables account can be linked to one or more items of media content made available by the media content provider. Further, an identifier (e.g. account number) of the receivables account of the media content provider can be linked to a 'donate' button displayed on a host site in association with the one or more items of media content made available by the media content provider. Alternatively, the identifier (e.g. account number) of the receivables account of the media content provider can be linked to a 'donate' button displayed on a host site in association with a player used to render or download the one or more items of media content made available by the media content provider. In this manner, the identifier of the receivables account of the media content provider can be linked with the media content and the 'donate' button displayed in association with the media content. Upon activation of the 'donate' button by a consumer/viewer, the identifier of the receivables account of the media content provider can be forwarded to a payment system (e.g. PayPal) to enable the appropriate media content provider account to be credited. Account identifiers, names, numbers, or other sensitive information can be encrypted or obfuscated to protect the information from third party access.

In a particular embodiment, the 'donate' button may link to a convenient payment interface of the host site or payment system, using which a consumer/viewer (e.g. user) can make a donation from a user account, also potentially maintained with the payment system, to a receivables account of the media content provider linked with the media content as described above. A "donation amount" feature within the payment interface may allow users to enter a donation amount, or select from a list of suggested amounts. Further, the payment interface may specify certain accepted currencies, or allow a user to make a donation in any currency.

The payment system (e.g. PayPal) backend can provide validation for the transfer of value from the consumer/viewer to the media content provider. For example, the payment system can validate the accounts of payor and payee and validate the transferred amount. In addition, the payment system backend may track how much value is generated by each item of media content or by each provider of media content. Further, the payment system backend may track how much value is donated or paid by a particular consumer/viewer.

In an example embodiment (e.g., a Flash page), upon activation of the 'donate' button, a user can be prompted to respond to a series of questions used to solicit, through a user's self disclosure, comments on the item of media content and comments on what motivated the payor to make a donation associated with the media content. These comments can be retained by the host site and optionally forwarded to the corresponding media content providers.

The 'donate' button or related display objects may also display an "honor roll", in which users who have made and originated significant contributions (e.g., in excess of a predetermined threshold) to the provider of a particular item of media content may be a displayed in a ranked order. In one example, the honor roll may attribute a "rollup" cumulative donation total of contributions made to the provider of a particular item of media content. Within the honor roll, this "rollup" cumulative donation total may be displayed adjacent to the user's name, and the list of users presented in the honor roll may be ranked-based on the "rollup" cumulative donation total.

Further, a particular embodiment may provide a mechanism whereby a user can conveniently download a version of the media content with integrated 'donate' button, and optionally a media content player, to his or her publication page (e.g., MYSPACE page). Such a version of the media content with integrated 'donate' button, which is instantiated from a host site or media content provider site, can be regarded as being a "child" version of the particular parent version of the media content available at the host site or media content provider site.

A parent version can be used to spread child versions over web pages on the Internet when a user "grabs" and downloads a version of the media content with integrated 'donate' button to a location of the user's choosing. A version of the media content with integrated 'donate' button may be grabbed by selecting an icon or display object associated with the media content and causing the copying of the media content and any associated HTML code from a web page. In this manner, a version of the media content with integrated 'donate' button may be dragged and dropped to a pre-determined area on a web page to create a child version.

A user who has posted a child version on a web page may not have the same rights with respect to the media content as a user who posted the parent version. However, in a particular embodiment, the host of a child version may be allowed to share a portion of the value donated as a result of other users activating the integrated 'donate' button on a child version. Thus, if a media content provider hosts a parent version and a first user hosts a child version, both the media content provider and the first user may receive a portion of the value donated by a second user who activates the 'donate' button on the child version. In a particular embodiment, the share percentages allocated to hosts of the parent and child versions can be in decreasing share values. In another embodiment, all proceeds from the donations made to a parent version and all proceeds from the donations made to all related child or subsequent generation versions can be allocated or paid to the owner of the parent version. It will be apparent to those of ordinary skill in the art that similar techniques as described herein can be used to create grandchild and great grandchild versions in a descending hierarchy. In each of these cases, the hosts of the child (or grandchild, or great grandchild, etc.) versions can share in a decreasing percentage of the revenue generated as a result of a user activating a 'donate' button on a particular version of the media content with an integrated 'donate' button. In an example embodiment, a version of the media content with integrated 'donate' button can also be distributed via email to another user who may be invited to post the emailed version in order to collect donations made via the 'donate' button.

Figure 6:
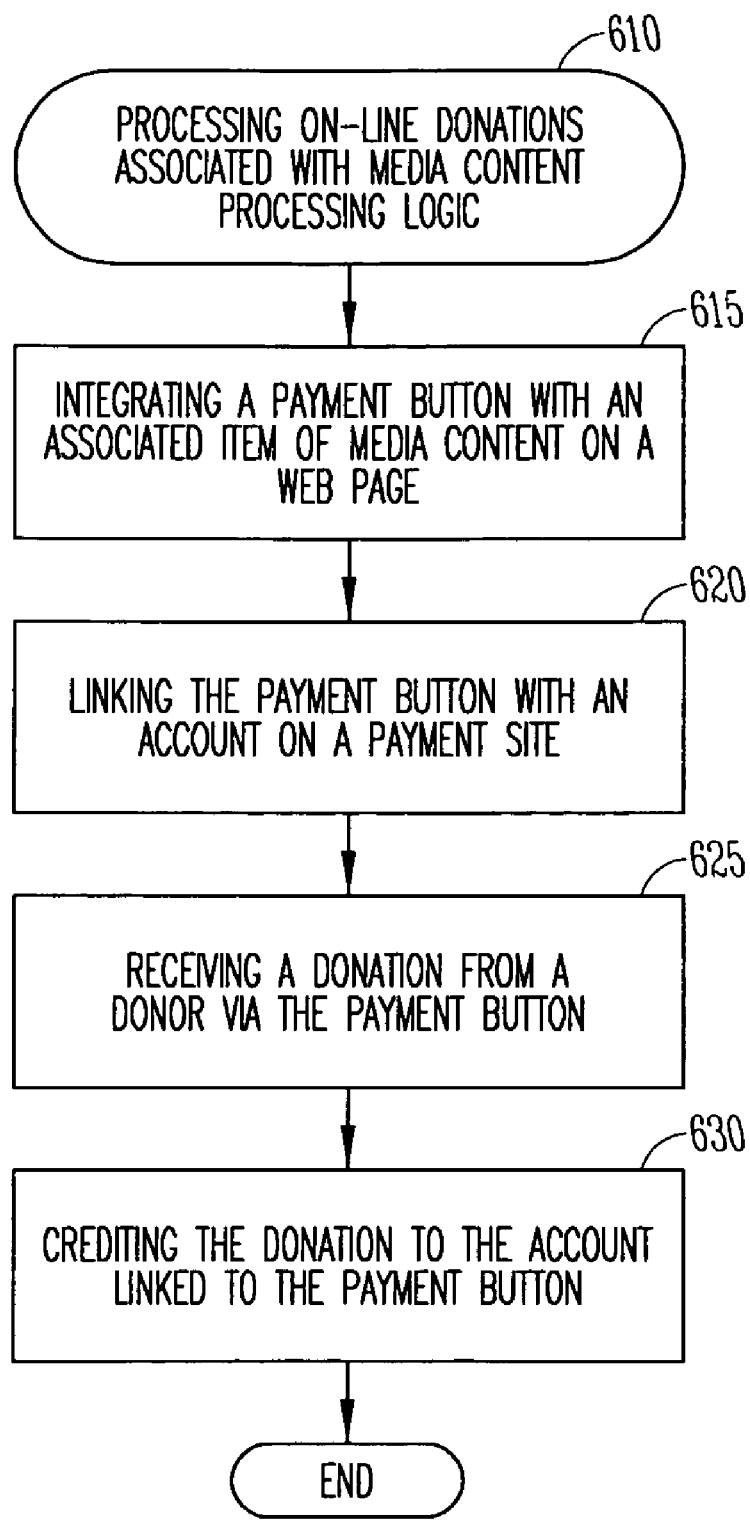
FIG. 6 illustrates a processing flow diagram for an example embodiment.

FIG. 6 illustrates a processing flow diagram for an example embodiment. In the embodiment 610 shown, a computer-implemented method and apparatus for processing on-line donations associated with media content includes: integrating a payment button with an associated item of media content on a web page (processing block 615); linking the payment button with an account on a payment site (processing block 620); receiving a donation from a donor via the payment button (processing block 625); and crediting the donation to the account linked to the payment button (processing block 630).

While the example embodiment describes separate and distinct media content viewing and payment systems, as examples of publication and financial systems, it will be appreciated that the described functionality may of course be implemented within the confines of a single system.

Details of an example publication system and of an example payment system are described below with reference to FIGS. 1-3. In an example embodiment, the functions described herein, may be supported by the described systems.

Figure 1:
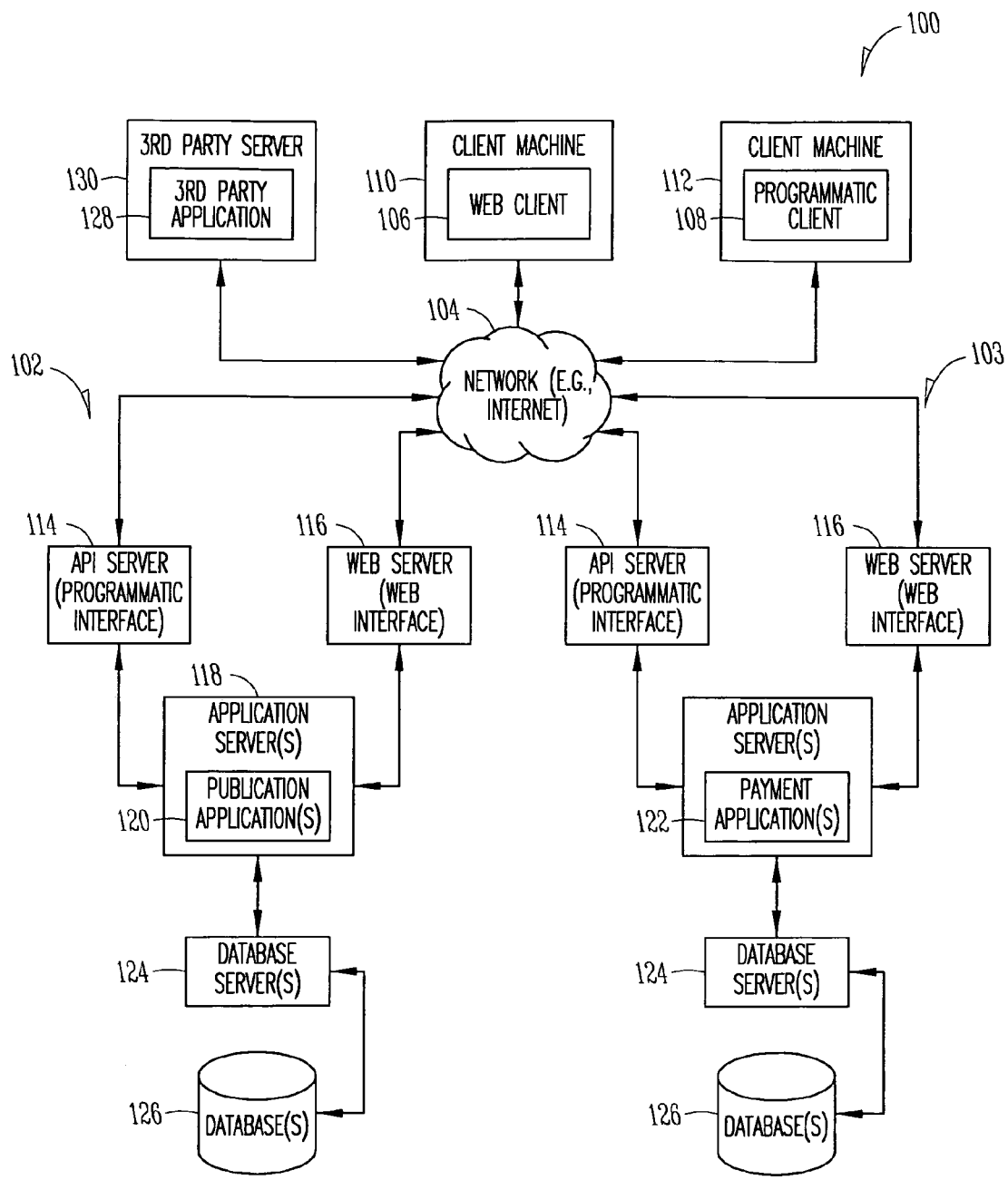
FIG. 1 illustrates an example embodiment of a networked system in which various embodiments may operate.

FIG. 1 is a network diagram depicting a client-server system, designated generally as 100, within which one example embodiment may be deployed. The system 100 may include any number of network systems, including a networked publication system 102 (e.g., a network-based social networking system or a network-based marketplace) and a networked payment system 103. Each of the systems 102 and 103 may provides server-side functionality, via a network 104 (e.g., the Internet or Wide Area Network (WAN)) to one or more clients. FIG. 1 illustrates, for example, a web client 106 (e.g., a browser, such as the INTERNET EXPLORER browser developed by Microsoft Corporation of Redmond, Wash. State), and a programmatic client 108 executing on respective client machines 110 and 112.

Dealing with the infrastructure of the networked publication system 102 as an example, an Application Program Interface (API) server 114 and a web server 116 are coupled to, and provide programmatic and web interfaces respectively to, one or more application servers 118. The application servers 118 host one or more publication applications 120 (e.g., marketplace or social networking applications). The application servers 118 are, in turn, shown to be coupled to one or more database servers 124 that facilitate access to one or more databases 126. Similarly, application servers of the payment system 103 may host payment applications 122.

The publication applications 120 may provide a number of publication functions and services to users that access the publication system 102. The payment applications 122 of the payment system 103 may likewise provide a number of payment services and functions to users. The payment applications 122 may for example allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120.

While the system 100 shown in FIG. 1 employs a client-server architecture, embodiments are of course not limited to such an architecture, and could equally well find application in a distributed, or peer-to-peer, architecture system, for example. The various publication and payment applications 120 and 122 could also be implemented as standalone software programs, which do not necessarily have networking capabilities.

The web client 106 accesses the various publication and payment applications 120 and 122 via the web interfaces supported by the web servers 116. Similarly, the programmatic client 108 accesses the various services and functions provided by the publication and payment applications 120 and 122 via the programmatic interface provided by the respective API servers 114. The programmatic client 108 may, for example, be a publication application (e.g., the TurboLister application developed by EBAY Inc., of San Jose, Calif.) to enable sellers to author and manage documents (e.g., listings) on the publication system 102 in an off-line manner, and to perform batch-mode communications between the programmatic client 108 and the publication system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the publication system 102 or from the payment system 103, support one or more features or functions on a website hosted by the third party. The third party website may, for example, provide one or more publication or payment functions that are supported by the relevant applications 120 and 122.

Figure 2:
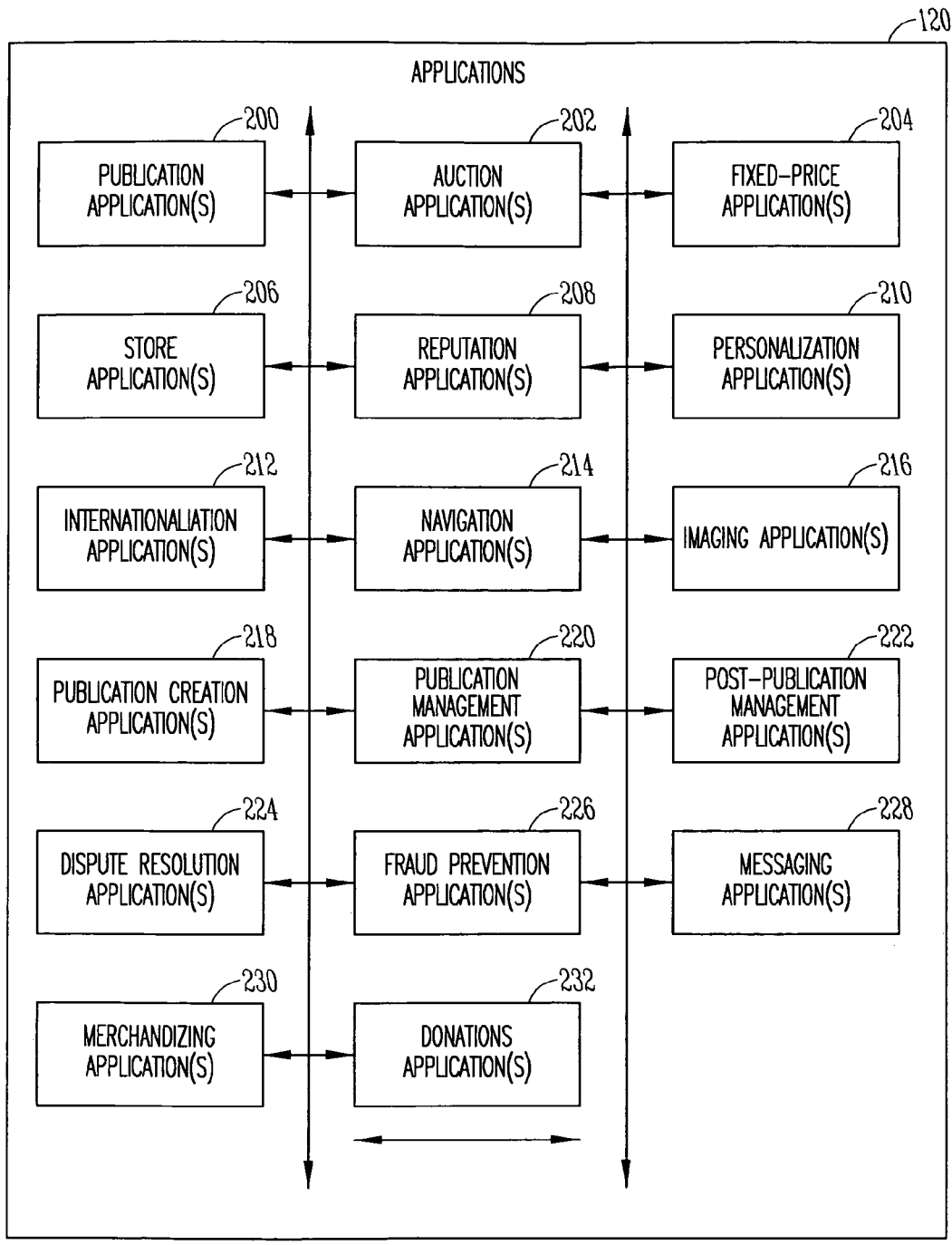
FIG. 2 is a block diagram illustrating multiple publication applications that, in one example embodiment, can be provided as part of a publication system.

FIG. 2 is a block diagram illustrating multiple publication applications 120 that, in one example embodiment, can be provided as part of the publication system 102. The publication applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 126 via the database servers 128.

The networked system 102 may provide a number of publishing, listing and price-setting mechanisms whereby a user may publish information (e.g., concerning him or herself and his or her interests, or goods or services for sale). Further, a user can express interest in the published information. Where the publication system 102 supports a social networking function, a user may express a social interest in the published information and the author thereof. Where the publication system supports a network-based marketplace function, for example, a buyer can express interest in or indicate a desire to purchase such goods or services, and a price can be set for a transaction pertaining to the goods or services. A donor can also express interest in or indicate a desire to donate money, goods or services, and a price can be set for a transaction pertaining to the donated money, goods or services.

The publication applications 120 may include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by EBAY Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of web sites that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Publication creation applications 218 allow users to conveniently also contend for publication via the publication system 102. For example, a user of a social networking site may conveniently be provided with templates, using which the user may author a personal profile and create links to content that reflects the user's interests. In another example, sellers may be enabled conveniently to author listings pertaining to goods or services that they wish to transact via the networked system 102, and publication management applications 220 allow sellers to manage such publications. In one example, where a particular seller has authored and/or published a large number of listings, the management of such listings may present a challenge. The publication management applications 220 provide a number of features (e.g., auto-relisting, inventory level monitors, etc.) to assist the seller in managing such listings. One or more post-publication management applications 222 also assist sellers with a number of activities that typically occur post-listing. For example, upon completion of an auction facilitated by one or more auction applications 202, a seller may wish to leave feedback regarding a particular buyer. To this end, a post-publication management application 222 may provide an interface to one or more reputation applications 208, so as to allow the seller conveniently to provide feedback regarding multiple buyers to the reputation applications 208.

Dispute resolution applications 224 provide mechanisms whereby disputes arising between users (e.g. transacting parties) may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within (or outside of) the publication system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The applications may also include a donation application 232, which include an account creation module, a nonprofit verification module, a badge tracking module, a donation amount tracking module, and a badge personalization module (not shown). These various modules may, in the various embodiments, be distributed between the publication system 102 and that the payment system 103. In an example embodiment, these modules are responsible for the performance of the various "donation badge" functions described herein.

Figure 3:
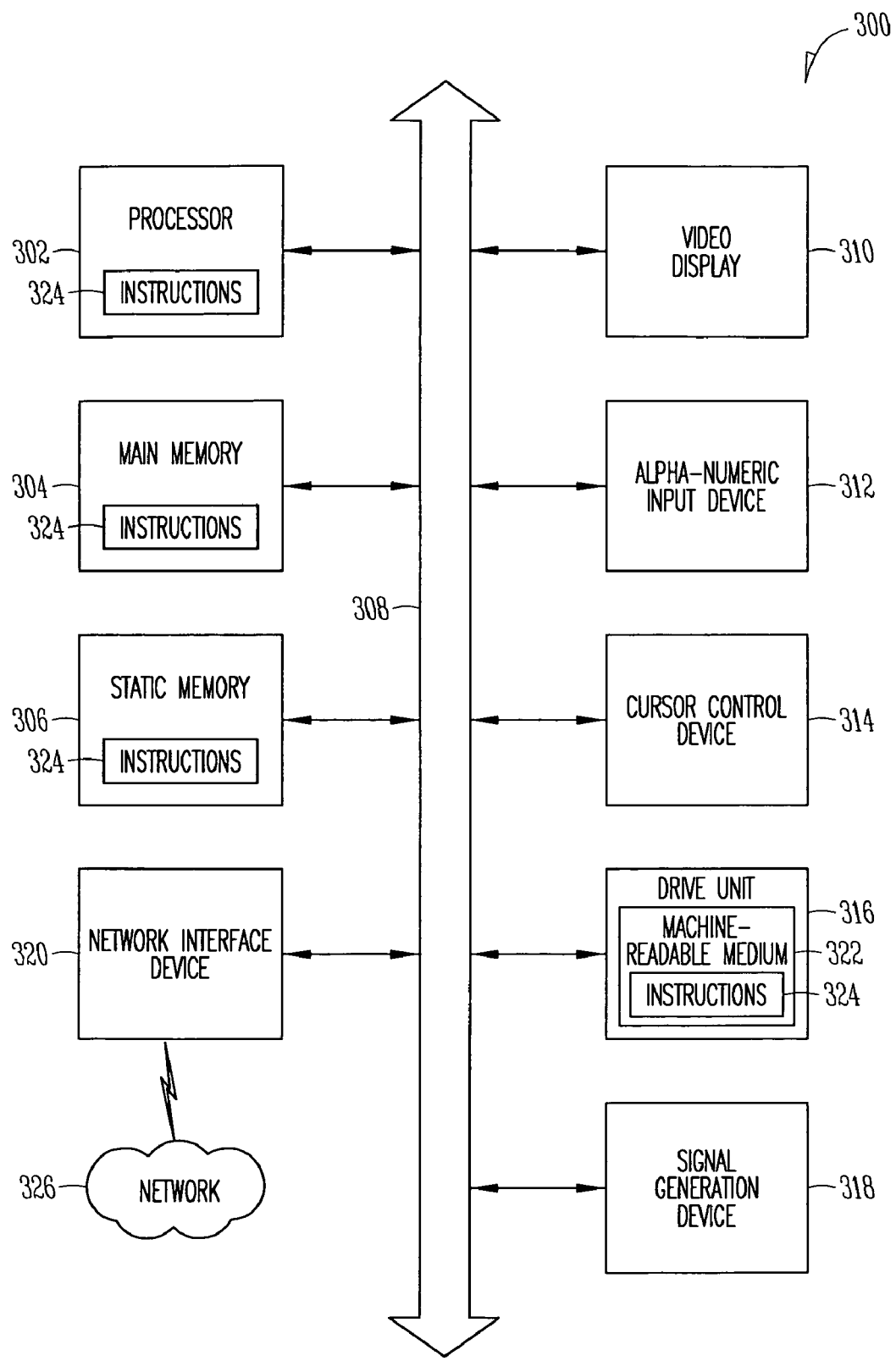
FIG. 3 shows a diagrammatic representation of a machine in the form of a computer system within which a set of instructions, for causing the machine to perform any one or more of the methodologies discussed herein, may be executed, according to an example embodiment.

FIG. 3 is a block diagram of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the invention can be performed by one or more programmable processors executing a computer program to perform functions of the invention by operating on input data and generating output. Method operations can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, embodiments may be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments.

The methods described herein may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above. It will be noted that, in an example embodiment, the processing logic may reside in any of the modules described herein.

Although embodiments of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, a computer-implemented method and apparatus for processing on-line donations associated with media content is disclosed. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   integrating, by use of a data processor, a payment button with an associated item of media content on a web page, the payment button being associated with a particular payee;
   linking, by use of the data processor, the payment button with a receivables account of the payee on a payment site;
   receiving an activation of the payment button by a donor, the donor being a different party than the payee;
   sending information indicative of the receivables account to the payment site upon activation of the payment button by the donor;
   receiving a donation from the donor following activation of the payment button by the donor; and
   crediting the donation to the receivables account on the payment site linked to the payment button.

2. The method as claimed in claim 1 including validating the account on the payment site.

3. The method as claimed in claim 1 wherein integrating the payment button includes providing a plurality of options associated with the payment button.

4. The method as claimed in claim 1 including creating multiple instantiations of the payment button in child versions of the item of media content that are displayed on a plurality of web pages.

5. The method as claimed in claim 1 including importing the payment button and the associated item of media content into a plurality of web pages.

6. The method as claimed in claim 1 including enabling a user to enter comments upon activation of the payment button.

7. The method as claimed in claim 1 including tracking the revenue collected via a particular payment button.

8. The method as claimed in claim 1 including distributing the payment button and the associated item of media content via email.

9. The method as claimed in claim 1 including activating the payment button via a pointing device.

10. An article of manufacture comprising a non-transitory machine-readable storage medium having machine executable instructions embedded thereon, which when executed by a machine, cause the machine to:
    integrate a payment button with an associated item of media content on a web page, the payment button being associated with a particular payee;
    link the payment button with a receivables account of the payee on a payment site;
    receive an activation of the payment button by a donor, the donor being a different party than the payee;
    send information indicative of the receivables account to the payment site upon activation of the payment button by the donor;
    receive a donation from the donor following activation of the payment button by the donor; and credit the donation to the receivables account on the payment site linked to the payment button.

11. The article of manufacture as claimed in claim 10 being operable to validate the account on the payment site.

12. The article of manufacture as claimed in claim 10 being operable to provide a plurality of options associated with the payment button.

13. The article of manufacture as claimed in claim 10 being operable to create multiple instantiations of the payment button in child versions of the item of media content that are displayed on a plurality of web pages.

14. The article of manufacture as claimed in claim 10 being operable to import the payment button and the associated item of media content into a plurality of web pages.

15. The article of manufacture as claimed in claim 10 being operable to enable a user to enter comments upon activation of the payment button.

16. The article of manufacture as claimed in claim 10 being operable to track the revenue collected via a particular payment button.

17. The article of manufacture as claimed in claim 10 being operable to distribute the payment button and the associated item of media content via email.

18. The article of manufacture as claimed in claim 10 being operable to activate the payment button via a pointing device.

19. A system comprising:
a processor;
a memory coupled to the processor to store information related to user donations; and
a donation module to integrate a payment button with an associated item of media content on a web page, the payment button being associated with a particular payee, link the payment button with a receivables account of the payee on a payment site, receive an activation of the payment button by a donor, the donor being a different party than the payee, send information indicative of the receivables account to the payment site upon activation of the payment button by the donor, receive a donation from the donor following activation of the payment button by the donor, and credit the donation to the receivables account on the payment site linked to the payment button.

20. The system as claimed in claim 19 being operable to validate the account on the payment site.

* * * * *

UNITED STATES PATENT AND TRADEMARK OFFICE
CERTIFICATE OF CORRECTION

| | | |
|---|---|---|
| PATENT NO. | : 8,050,987 B2 | Page 1 of 1 |
| APPLICATION NO. | : 12/169829 | |
| DATED | : November 1, 2011 | |
| INVENTOR(S) | : Deborah Y. Liu et al. | |

It is certified that error appears in the above-identified patent and that said Letters Patent is hereby corrected as shown below:

In Drawings
On Sheet 2 of 6, Reference Numeral 212, Figure 2, line 1, delete "INTERNATIONALIATION" and insert -- INTERNATIONALIZATION --, therefor.

Signed and Sealed this

Thirty-first Day of January, 2012

David J. Kappos
*Director of the United States Patent and Trademark Office*